United States Patent [19]

Thomas

[11] 3,748,394

[45] July 24, 1973

[54] CONFERENCE FACILITIES FOR A TDM EXCHANGE

[75] Inventor: David Michael Thomas, Ottawa, Ontario, Canada

[73] Assignee: International Standard Electric Corporation, New York, N.Y.

[22] Filed: Oct. 6, 1971

[21] Appl. No.: 187,140

Related U.S. Application Data

[63] Continuation of Ser. No. 853,134, Aug. 26, 1969.

[52] U.S. Cl. .......... 179/18 BC
[51] Int. Cl. .......... H04m 3/56
[58] Field of Search .......... 179/1 CN, 15 AT, 179/18 BC

[56] References Cited

UNITED STATES PATENTS

| | | | |
|---|---|---|---|
| 3,508,007 | 4/1970 | Goodall | 179/18 BC |
| 3,551,600 | 12/1970 | Berch | 179/18 BC |

*Primary Examiner*—Kathleen H. Claffy
*Assistant Examiner*—David L. Stewart
*Attorney*—C. Cornell Remsen, Jr., Delbert P. Warner et al.

[57] ABSTRACT

Conference facilities are provided in a Time Division Multiplex telephone system. The conference facilities include a scanner which scans channels participating in a conference call to determine which ones are actually carrying speech signals and to route any such signals to each of the other participants in the conference call. The scanner expressly avoids the transmission of speech back to the line being sensed in order to avoid excessive side-tone.

4 Claims, 10 Drawing Figures

Inventor
D. M. THOMAS
By
Attorney

CONFERENCE FACILITIES FOR A TDM EXCHANGE

This is a continuation of application Ser. No. 853,134, filed Aug. 26, 1969.

This invention relates to a time division multiplex telephone switching system, and especially to the provision of conference facilities in such a system.

According to the present invention there is provided an automatic telephone exchange in which communication connections are set up in time division multiplex manner, there being a plurality of incoming multiplex highways to and outgoing multiplex highways from the exchange, in which a conference circuit is provided for the establishment of conference calls, each such call involving three or more of the subscriber lines served by the exchange, and in which said conference circuit includes a scanner which scans multiplex channels in use for the lines involved in the conference, said scanner scanning in search of the channel whose user commences to talk, means under control of said scanner and responsive to the detection of a line in the talking condition to switch that line's channel to the channels in use for the other lines involved in the conference, and means also responsive to said detection to prevent the transmission of the modulation due to one of said line's speech being sent to that said one of said lines.

The channels which are involved in a conference call are continuously scanned while the conference call is in existence, the last-selected "source" channel having the modulation due to its speech switched to all other channels involved, but not to itself. This latter provision avoids the excessive side-tone which would otherwise occur and which would be irritating to the speaker. When the scanner detects that another channel has commenced to carry speech information it causes the two last mentioned means of the preceding paragraph to function so that the new speaker's channel becomes the "source" channel and the other channels become the recipient channels.

Embodiments of the invention will now be described with reference to the drawings, all of which are highly schematic, and in which.

Figure 3:
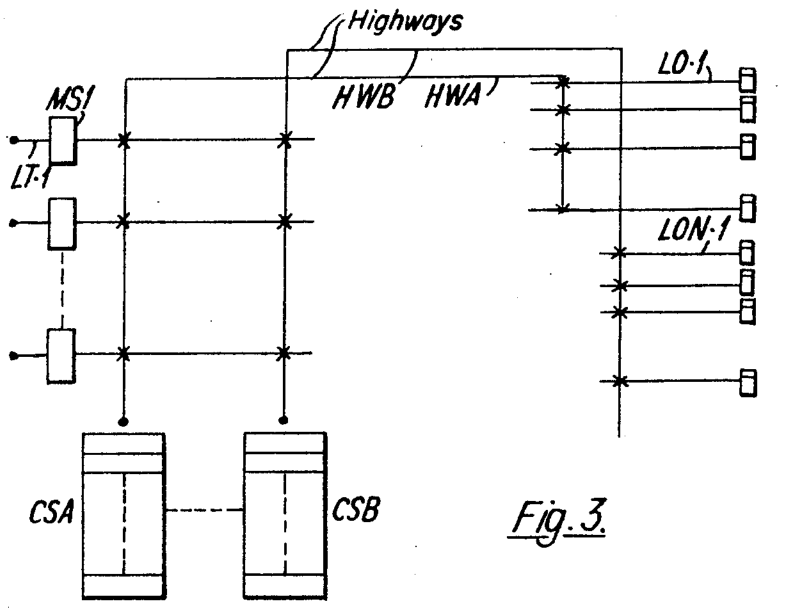
Figure 5:
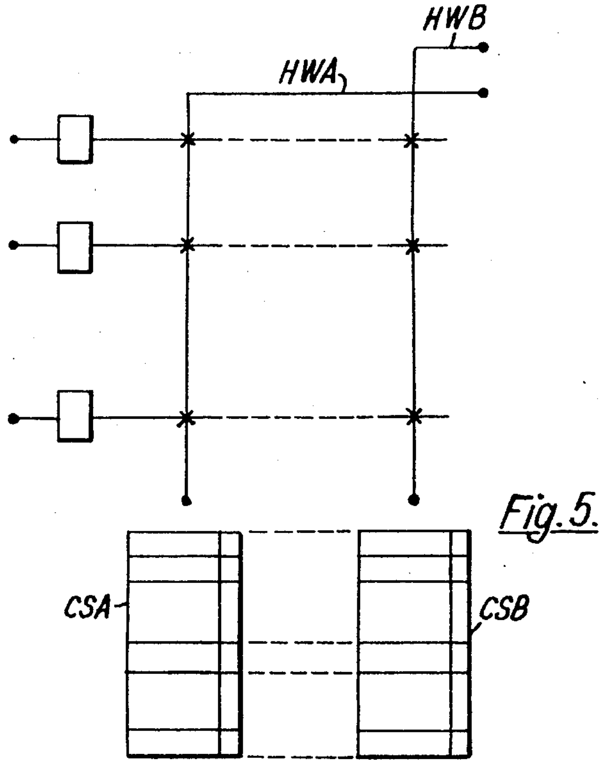
Figure 4:
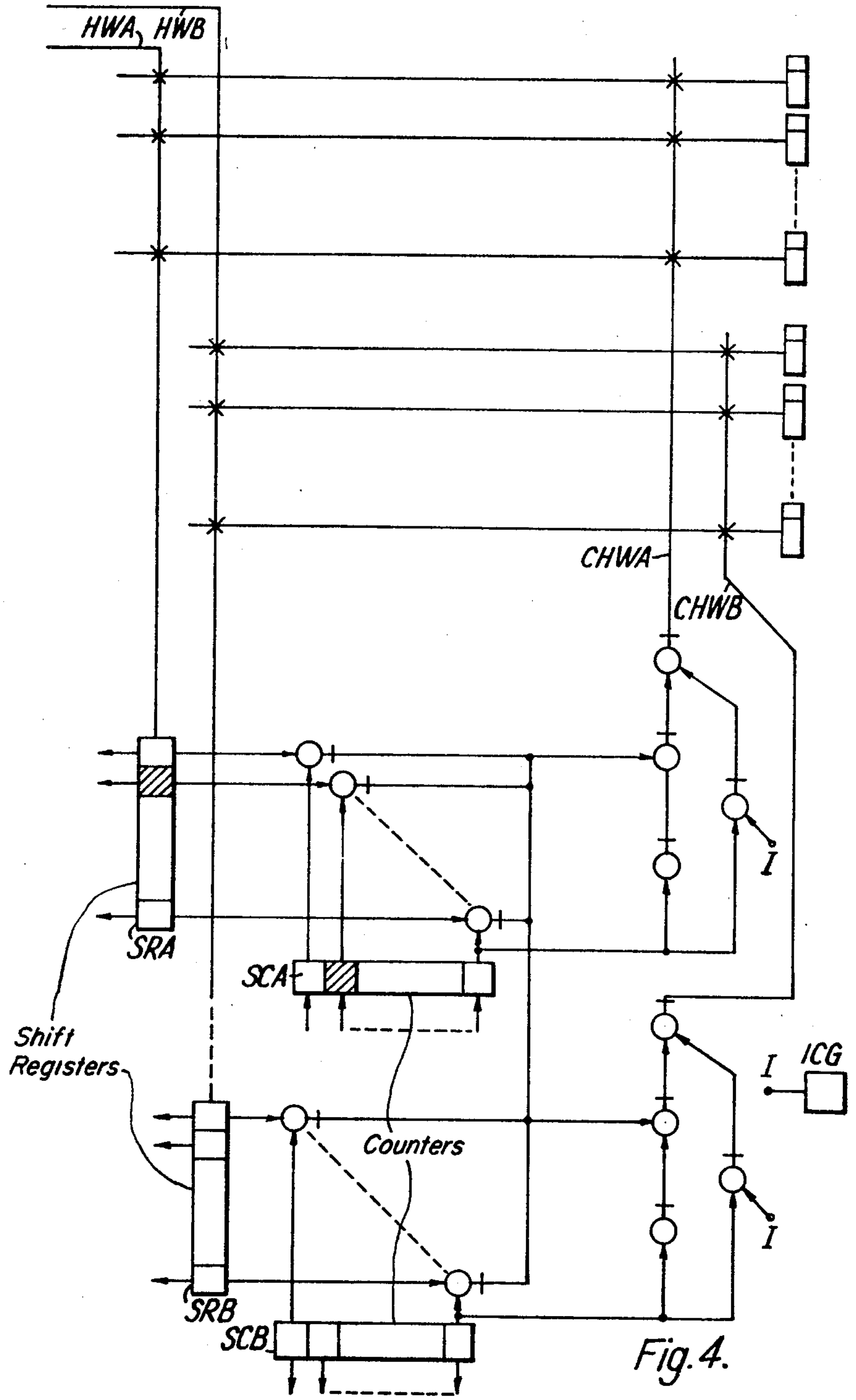
Figure 6:
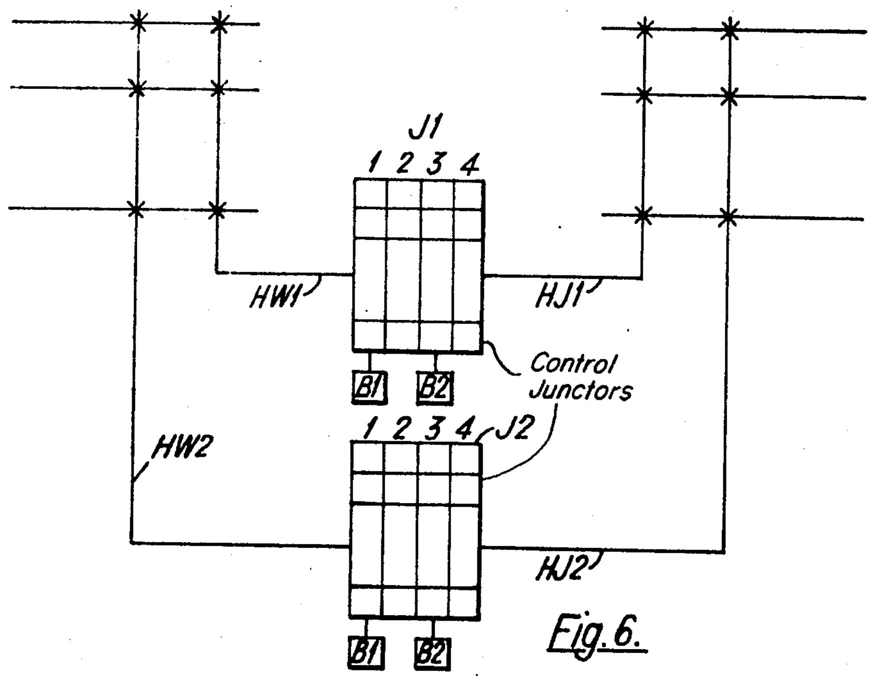
Figure 8:
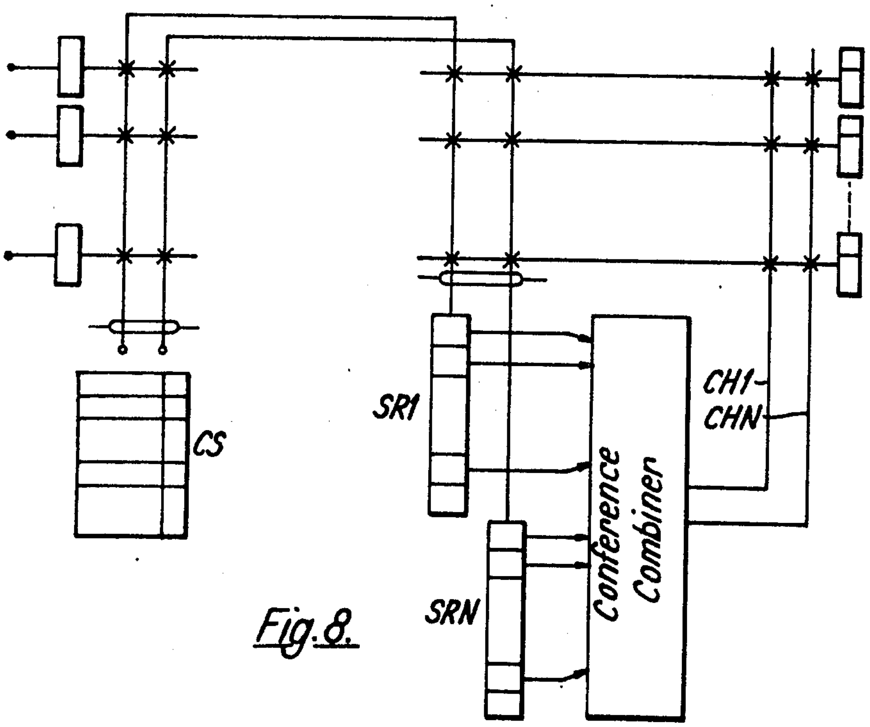
Figure 7:
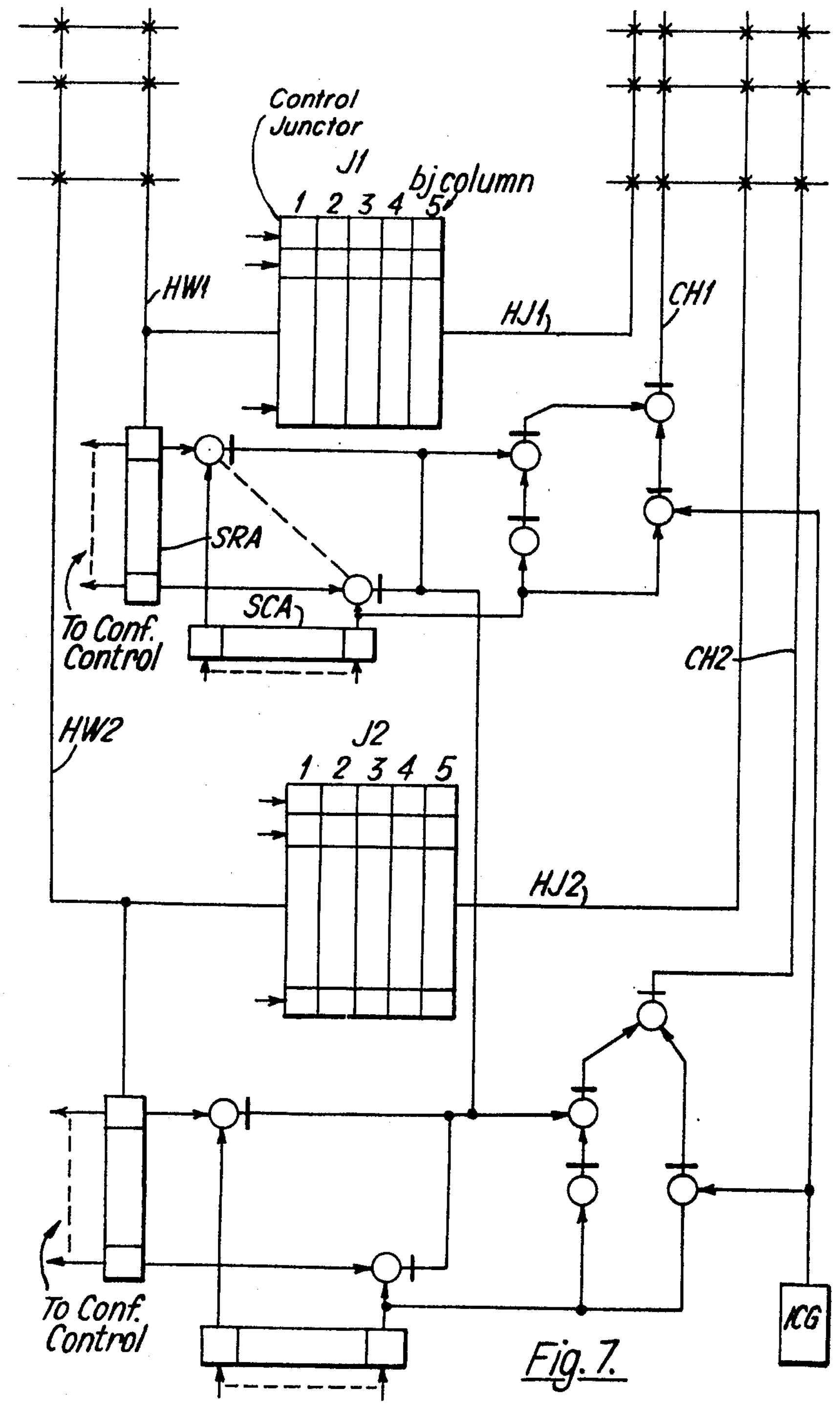
Figure 9:
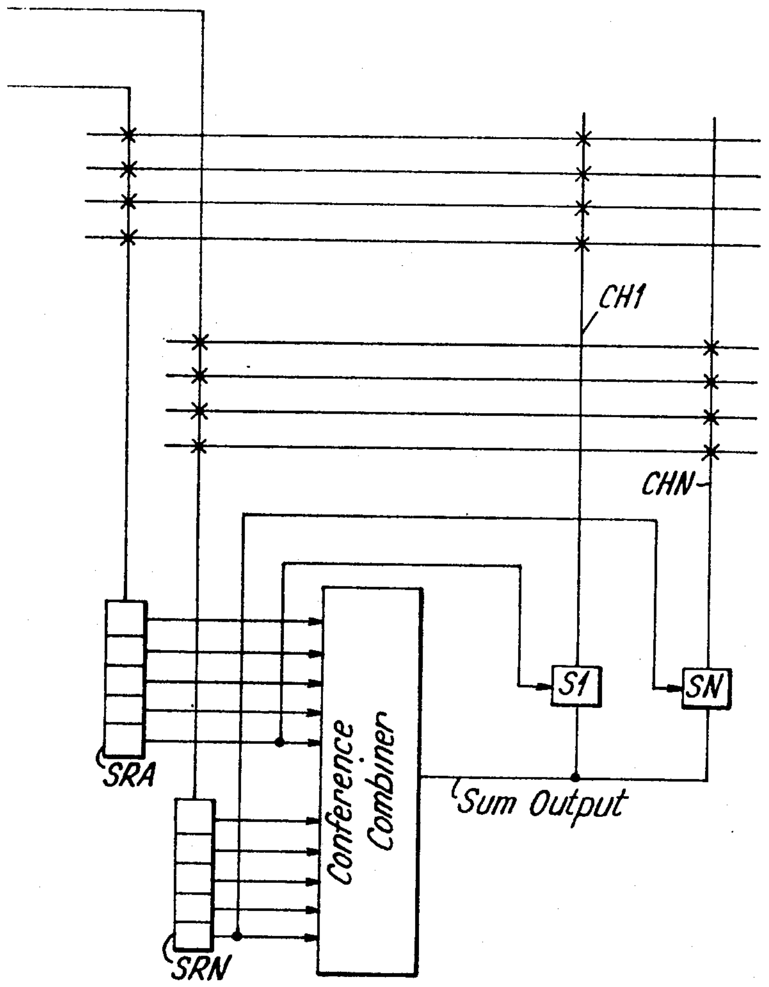
Figure 10:
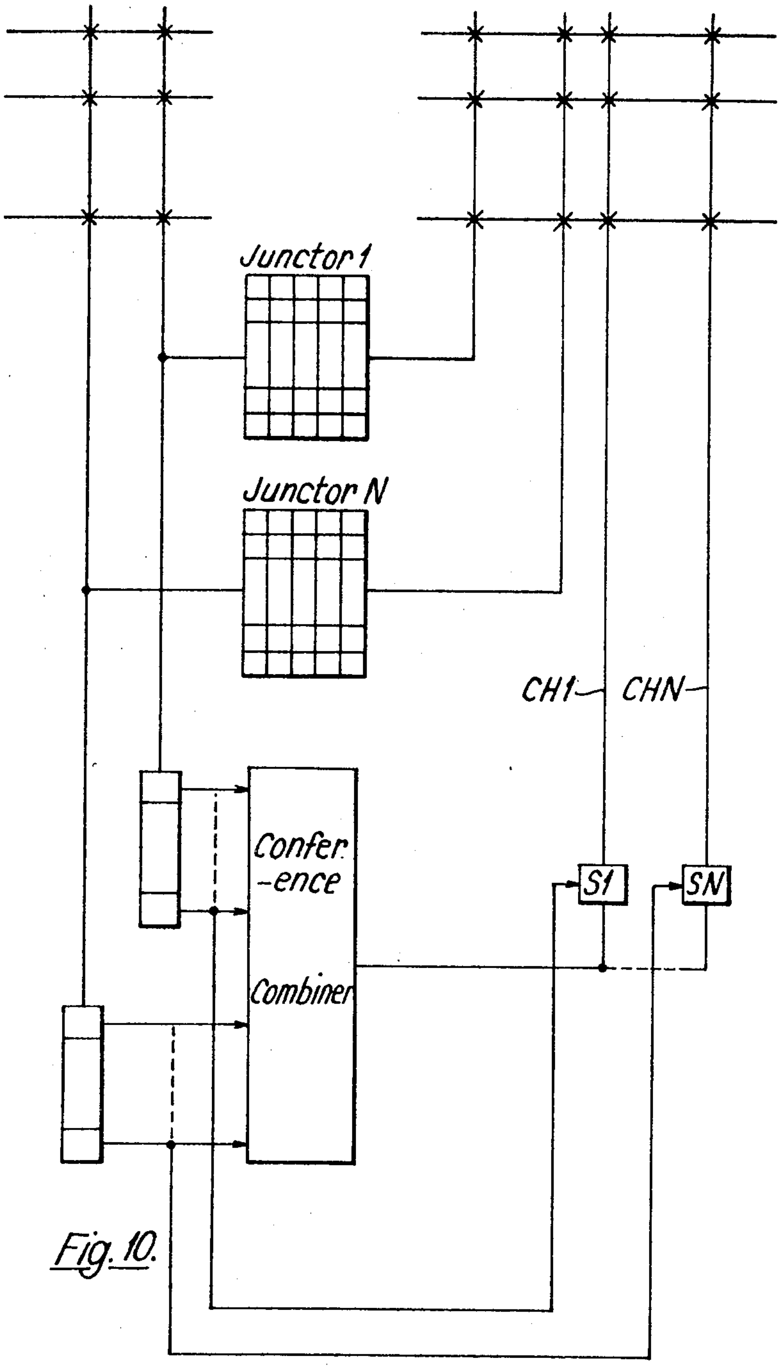

FIG, 3 shows the arrangement of a multi-highway switch;

FIGS. 4 and 5 show how the conference facility is provided in a switch such as that shown in FIG. 3, FIG. 4 relating to the output side and FIG. 5 the input side of the switch;

FIG. 6 shows the arrangement of a shared-highway TDM switch;

FIG.7 shows how the conference facility is provided for a switch such as shown in FIG. 6;

FIG. 8 shows how a conference facility is provided for a parallel single-highway PCM switch;

FIG. 9 shows the output side of a multi--highway "character multiplex" PCM switch, one highway only of each parallel set being shown, with a conference facility; and FIG. 10 is an arrangement using a shared highway switch, but otherwise similar to FIG. 9.

BIT-MULTIPLEXED Δ-Σ MODULATION

In the first few embodiments of the invention, a form of Delta (Δ) modulation is used in which for each channel to be dealt with over a TDM link a single bit is transmitted, which indicates whether the latest speech sample was greater or smaller than the previous such sample. Thus the intelligence transmitted at any one time position does not, of itself, indicate the magnitude of the sample. A direct current condition is represented in this form of modulation by an alternation of 1's and 0's.

With such a modulation technique, conferencing of more than one Δ-Σ signal cannot be performed by an arithmetic operation, as would be possible in a conventional PCM system. In the arrangement to be described herein, which use this Δ-Σ technique, the conferencing arrangement includes a scanner which scans all channels in use for a conference, and this detects when a subscriber using one of these channels commences to speak. When he does so, the bit stream for the channel he is using alters from the 1-0 alternation into a series of 1's, and the detection of such a change is therefore regarded as an indication that the subscriber in question has started to speak. When the scanner detects this condition, indicating that a conferee has started to talk, that conferee's channel is switched so that it is connected to the channels in use for all other conferees. At the same time the transmission of the speech modulation to the talker's own channel is inhibited, being replaced by the idle code, i.e, the alternate 1's and 0's which represent DC. This inhibition ensures that the talker does not receive an undesirably high side tone.

The channels in use for the conference are periodically scanned while the channel thus selected is switched as just described, and when a new talker is detected, that talker's channel becomes the "source," the others then being the recipients.

SINGLE HIGHWAY SWITCH (FIGS. 1 AND 2)

Figure 1:
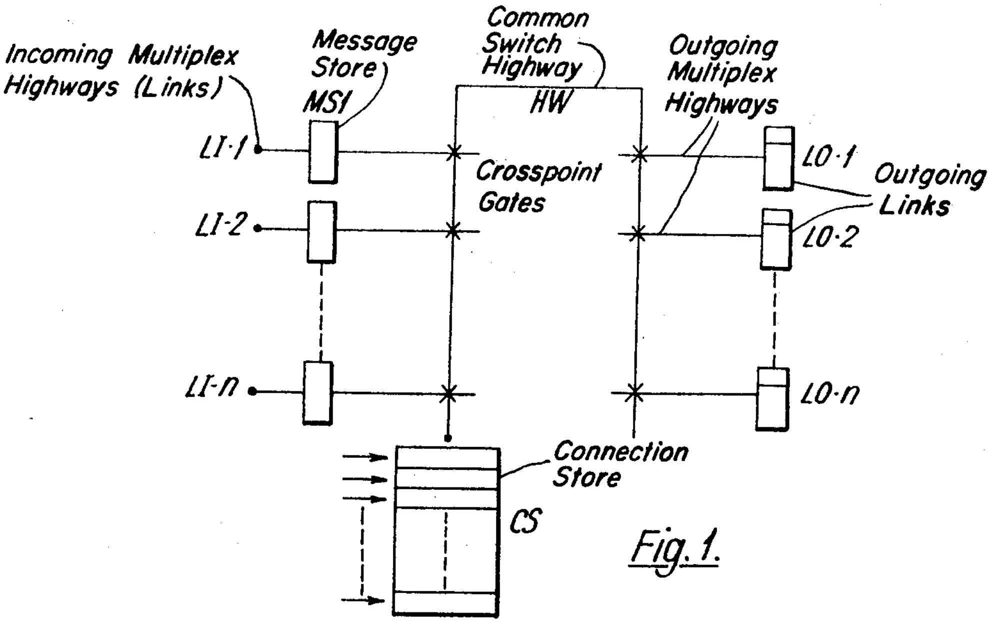
FIG. 1 shows a single highway TDM switch.

Referring first to FIG. 1, the switch serves as a set of incoming multiplex highways LI-1, LI-2 . . . LI-n, and a set of outgoing multiplex highways LO-1, LO-2 . . . LO-n, all of which are assumed to be identical. These highways are interconnectable over the common switch highway HW, to which they may be connected by normally-closed gates, each represented by a cross, and hereinafter called cross-point gates. Further, for each incoming link there is an outgoing link, e.g. LO1 is the "return" link for the "go" link LI-1, i.e. we have a "four-wire" system. These links are also multiplex devices, but the term link is applied to them to minimise confusion.

Each incoming link is served by a message store, such as MS-1 for the link LI-1, and each such message store has a unique storage element for each time division channel on its link. The incoming links are served by a connection store CS, which is a co-ordinate store with a connection row for each time position at which an outgoing link can be connected to the switch highway HW. For every such channel there is a single time slot, so that with $n$ outgoing links and $m$ slots per link, $mn$ slots are needed for communication. With $n$ outgoing links, the channel period is divided into $(n+1)$ slots, which are referred to as minor slots, the "channel periods" being the major slots. Of the minor slots in each channel period, the $(n+1)$th is reserved for writing into the message stores. The gate between HW and LO1 is operated at minor slot 1, that between HW and LO2 at minor slot 2, and so on.

Thus then a message bit (0 or 1) arrives it is written into its incoming link's message store such as MS1. The store CS, as mentioned above, has a row for each of the mn time slots referred to above, so that its first row is for minor slot 1 of major slot 1, its second row is for minor slot 2 of major slot 1, and so on. When a connection is to be set up a row of the store CS is taken into use, and the address of the message store which contains the bit for that connection is recorded in this row. The store CS is read cyclically, and when a row which contains an address is read, the gate between the message store to which that address corresponds and the highway HW is opened. Consequently this bit is gated to the appropriate outgoing link because the gates between each outgoing link and the highway HW are each opened at the appropriate slot times. Thus at all $m$ of the minor slot times for highway LO-1, the gate between HW and LO1 opens, so that any bit gated out of a message store during such a minor slot time reaches LO1. In a similar way, at all minor slot times 2, the gate between HW and LO-2 opens, and so on. Thus the gating between the outgoing links and the highway HW is independent of the cross-office connections being established.

Figure 2:
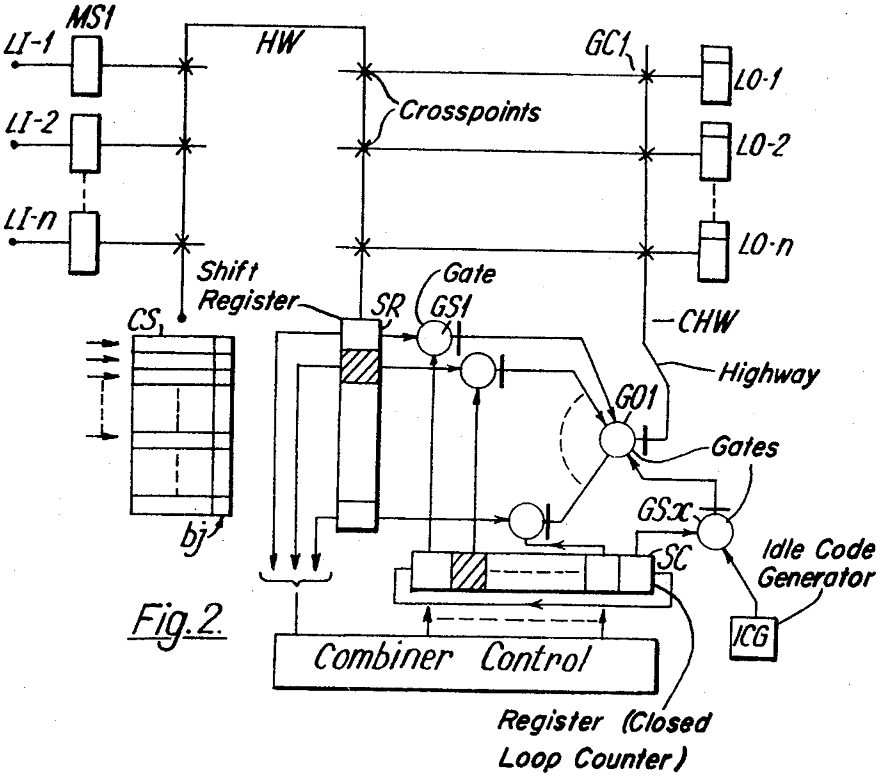
FIG. 2 shows how the conference facility is provided in such a switch.

Now it is necessary to consider the establishment, of a conference call via such a TDM switch, and the means for achieving this appear in FIG. 2. It is assumed that a conference call can involve up to 20 conferees, so that with the modulation system considered, it is necessary for a talker in such a conference call to switch each bit of modulation due to that talker to up to 19 other conferees.

In order to cater for conference calls, the connection store CS has capacity for an extra bit in each of its rows, which is indicated in FIG. 2 by the column bj at the extreme end of each row. Where the caller, by the signals which he sends, indicates that a conference call is wanted, the processor (not shown) causes the bit bj to be stored in the rows of CS seized for all of the conferees. When a bit bj is read during the read-out from the store CS, indicating that the row in question is in use for a conference call, the contents of the message store whose address is in that row is read out to the highway HW in the usual way by opening the cross-point gate between that message store and the highway HW. The presence of the extra bit bj causes the gate between HW and the outgoing link appropriate to the row being read to be inhibited, so that the message bit, although it appears on the highway HW does not reach the outgoing link which corresponds to the row of CS which has been read. Thus the speaker does not receive his own speech. Instead, this message bit enters the shift register SR, which has the same number of stages as there are conferees.

The control equipment of the exchange, which functions in stored programme manner, receives from the caller who sets up the conference call, the numbers of the lines to be connected, and in addition to the normal call setting operations (not described herein) it sets the shift register SR so that it has as its effective number of stages a number equal to the number of conferees. This register SR is constructed with 20 stages, some of which can be disabled to enable it to have less than 20 effective stages. Such can be done in well-known manner.

Thus the contents of the message stores for the conferees fill the register SR, so that when a message bit from one of the message stores (MS) is gated onto the highway HW, the contents of that same message store, which was gated onto HW during the preceding TDM frame, is in the last stage of the register SR. As the new bit enters the uppermost end of SR, therefore, the preceding bit from the same conferee leaves the bottom end of SR and is lost.

Thus at any time, one message bit from each conferee is present in the register SR. At some defined slot time (i.e. one of the $m(n+1)$ minor slot times), which may be the first after the beginning of the local frame, the contents of every stage of the register SR are examined by a conference scanner, which forms part of the Combiner Control equipment, this scanning being repeated one frame time later when the channels are temporarily in the same position, and so on.

The scanner thus examines every channel in use for the conference call once per frame, and decides which is the source channel, i.e. which one has a talking conferee. The stage of the register being examined is known, due to the connections from the register SR to the combiner control. When the scanner finds for the examined stage of the register SR that a burst of successive 1's have occurred, a 1 is written into the equivalent stage of a further register SC, connected as a closed-loop counter. The need to test for several successive 1's from the same talker calls for storage (not shown) in the scanner. In FIG. 2, the channel selected as the source is shown shaded. When using the $\Delta$-$\Sigma$ modulation method, this detection is effected by noting when the channel, which was formerly in the idle condition (its modulation then being 1010 . . . ) has several successive 1's, which shows that the subscriber using it has commenced to talk. The counter SC then enables that one of the gates such as GS1 connected to the output of the stage set to 1, so that a bit is gated from SR via a gate such as GS1 and gate GO1 to a conference highway CHW, the gates such as GC1 between this highway and the outgoing links being controlled by the "conference" bits bj.

The counter SC receives a shift pulse every time that the shift register SR receives one, i.e. at the time slots appropriate to the conferees, so the 1 written into the counter SC moves therealong. During its progress, the "sources" message bit is repeatedly gated out to CHW each time that a row of CS for an outgoing channel involved in the conference is read. When the slot time which defines the source conferee occurs, the message bit for this conferee is in the last stage of the register SR, and the 1 is in the last (i.e. extreme right hand) stage of the counter SC. The message bit is not at this time switched to the highway CHW, but a gate GSx is enabled to switch the idle code (10101010 . . . ) from an idle code generator ICG to the highway HW. During this progression therefore, the message bit from the source talker is gated on to the highway CHW at the times appropriate to all conferees except the talker.

At each of the reference time slots mentioned above, every stage of the shift register SR is examined by the scanner in the combiner control to establish the identity of the talking channel by seaching for the beginning of speech patterns as already mentioned. If such a pattern is detected, the control ring counter SC is cleared by the combiner control and the latter writes a 1 into the stage thereof appropriate to the new source channel. Thus switching between the talking conferees occurs rapidly, and the talker's own modulation is not sent back to him over his return link.

MULTI-HIGHWAY SWITCH (FIGS. 3–5)

In the multi-highway switch, FIG. 3, outgoing links are grouped together, with, for instance, four links in a group, each group being served by its own highway, two such highways HWA and HWB being shown.

Each such highway has its own connection store, e.g. CSA and CSB, and each such store includes a row for every outgoing link channel served by its highway HWA, HWB. With $x$ highways for cross-office switching, at each minor slot, one row in each of the $x$ connection stores is read at the same time, and the contents of the message stores defined by those read-outs are simultaneously switched across the office, one on each highway such as HWA, to the outgoing links defined by the slots.

The provision of the conference facility is in this case somewhat complicated by the possibility that several conferees will have the same slot time although they are reached via different outgoing links. If one of them is the source, at his time slot this conferee must be sent the idle code, while any other conferees on the same time slot get the contents of the source's message store. Thus at least two conference highways are needed, CHWA and CHWB, one to carry the source's message bit and the other the idle code. The idle code can be switched to either conference highway, as called for by the exigencies of the current conference call.

FIGS. 4 and 5 together show how this is done: all conference highways carry the source's message bit for a whole frame period, except the highway serving the source's outgoing link. This latter carries the source's message bit for all slot times except the slot for the source's outgoing link, when idle code is switched to that link.

Each main highway HWA, HWB, drives a shift register such as SRA for HWA, whose number of stages is set to the number of conferees by the combiner control (not shown in FIG. 4), and as in FIG. 2, each shift register contains a bit from each conferee on its switch highway. At a reference time relative to the local frame a scanner examines all shift register stages and after several frames it determines which stage of which register contains the source bit. This scanner is, of course, somewhat more complex than the scanner used in the single highway switch as it has to cope with a number of shift registers.

The operation is generally the same as for the previous case, with the difference that each message bit is gated in the manner described with reference to FIG. 2 onto all conference highways until the source bit reaches the end of one of the counters SCA and SCB. Note that when three or more switch highways are provided, there are three or more such counters. When this happens, which is at the source's slot time, this bit is inhibited from the conference highway which serves the source, idle code being switched to that highway, while the other conference highway(s) receive the message bit in the usual way. The extra bit bj, written into the store such as CSA or CSB by the processor during call setting, in the conference connection store row opens and/or inhibits the switch highway-outgoing link gates at the appropriate times.

SHARED HIGHWAY SWITCH (FIGS, 6 AND 7)

This type of exchange is known as the space-time-space (STS) type, since there are two stages of space switching with one of time switching in between. The normal 4-wire operation of this switch for a call between two subscribers is as follows, see FIG. 6. For $m$ duplex channels there are $m/_2$ message store elements, one store element being used for a 4-wire connection between any two users, i.e. a message store element stores the message bits of two users on a duplex connection. If there are $n$ channels in a frame, $n$ message store elements are taken together in a group, and each group has access to every incoming and outgoing link via a separate highway such as HW1 and the associated gates, marked by crosses.

Associated with each group of message stores are the control stores J1, J2 which contain the information as to the operation of the highway link gates, the complete block of storage being termed a junctor. Hence with N duplex links we have $N/_2$ junctors, each junctor being connectable to every incoming and outgoing link. The junctor rows are addressed sequentially in a cyclic manner for half the frame period, and in a random access manner (acyclic) for the other half, so that each channel time is divided into two periods, a cyclic period and an acyclic period.

In each junctor, column 2 contains the cyclic space address, column 3 the acyclic space address (for the operation of the gates shown by crosses), column 4 is the message store, and column 1 contains the time address, which is read during the cyclic half channel time and contains the information necessary for the random access of the junctor rows during the acyclic period.

Consider a connection between a user on channel $t_x$ and a user on channel $t_y$, where the users may or may not be on the same link. During the setting up of the call the processor arbitrarily assigns a cyclic time slot to one user and an acyclic time slot to the other, and the cyclic and acyclic time slots are further subdivided into a read and write period. Assume that $t_x$ is chosen as the cyclic user: at the channel time $t_x$ the associated junctor row is read. The contents of column 1 and 3 are involved in another duplex connection and are not considered here. The cyclic space address (column 2) contains the address of the crosspoint gate connecting the junctor to the incoming and outgoing links of the user on $t_x$ that we are considering. The message store column 3 contains the message bit of user $t_y$ previously written in the manner described below. In the first half of $t_x$ cyclic the defined gate on the outgoing side is operated, and the contents of this message store is switched into the required outgoing link via the junctor highway such as HJ1. In the second half of $t_x$ cyclic the corresponding gate on the incoming side (which connects the highway such as HW1 on the input side of the junctor with the incoming half of $t_x$'s duplex link) is operated under the control of the same cyclic space address row and $t_x$'s message bit is switched into the message store element.

At $t_y$ cyclic the contents of column 1 and 3 are read out and stored in buffers B1 and B2 (columns 2 and 4 are also read in the same manner as above, but they are concerned with a completely separate connection). These buffers are addressed at $t_y$ acyclic. Buffer B1 contains the time address of $t_x$ and refers back to the message store read cyclically at time $t_x$, which now contains the message bit of user $t_x$. Buffer B2 contains the address of the incoming and outgoing crosspoint gates connecting the junctor with $t_y$'s link (they have the same address, but they are on different sides of the switch). At the first half of $t_y$ acyclic the outgoing crosspoint gate is operated and the contents of the message store defined in the time address contained in B2 is switched via the junctor highway into $t_y$'s outgoing link. At the second half of $t_y$ acyclic the incoming crosspoint gate is operated and $t_y$'s message bit is written into the same message store element. The complete duplex connection is now established.

Consider the conference facility for this switch (FIG. 7). All conferees are assigned the cyclic period, and the processor (not shown) selects rows in the junctors which are free for these periods and writes an extra bit (column 5) in these rows to indicate that they are involved in a conference. Hence more than one junctor may be involved in the conference. The extra bit causes the message bit of the channel at whose time this extra bit is read to be gated into a shift register such as SRA. There is one register for every junctor and they operate on the same principle as in the single and multi-highway switches described above. That is, each register has the same number of stages as there are conferees on the junctor with which the register is associated, and the register is clocked at channel times belonging to the conferees on that junctor. In the second half of the cyclic time slots belonging to the conferees the message bit of those users are gated into the relevant shift registers. The conference control scans every stage of the registers at some time position in the local frame (as in the other arrangements) and ascertains which stage contains the source bit at this time. The control writes '1' into the corresponding stage of the control ring counter such as SCA belonging to the shift register which was found to be serving the source, in the same manner as for the multi-highway switch. The output from the "source" stage is gated onto conference highways such as CH1, there being one highway for every junctor. In the same way as for the multi-highway switch, at the source's channel time idle code is switched onto the conference highway belonging to the source's junctor. During the first half of the cyclic period of one of the conferees the contents of the cyclic space store are read together with the extra bit. The highway link gate so defined by this space store on the conference highway belonging to the junctor containing this space store is opened, and either the source's message bit is gated into the link of the "sink" assigned to that junctor row or if the particular row addressed belongs to the source, this user receives idle code.

PULSE - CODE - MODULATION

PCM takes the following form: the waveform is sampled periodically and the value of the sample is coded into a binary word or several bits. The coding may be linear, or more usually may obey some companding law, which may or may not be digitally derived. Hence any word representing a sample is a measure of the actual value of the waveform at that time. If the companding law is a digital one, it is therefore possible to digitally add samples from two or more different waveforms to make a PCM word which would be the same as that derived by analogue mixing of the waveforms followed by sampling and coding of the resultant waveform. Hence a true conference can be performed, as opposed to a voice switched system necessary in delta forms of modulation.

SINGLE HIGHWAY SWITCH

To switch a PCM character across the office, instead of a single bit, the switch must be modified as compared with the above described arrangements. The character could be switched across in a serial manner, or alternatively a serial-to-parallel conversion could be made, in which case the character is switched in parallel, each bit of the character on a separate wire controlled by separate gates, operating in parallel. After switching across the office a parallel-to-serial conversion can be made to reconstitute the PCM character. Such a system is the usual one and will be considered.

To perform a conference for a maximum of 20 users on such a switch the following system is employed, see FIG. 8. In the same way as for the Δ-Σ modulation switch, the parallel bits of a PCM character belonging to a conferee's message are switched into a bank of shift registers SR1-SRN, one register for each bit of the character. In FIG. 8 only two of the groups of parallel highways and two of the registers are shown for simplicity. These registers have the same number of stages as there are parties to the conference.

At any time slot defining one conferee's outgoing highway channel, the message character generated by that user is contained in the last stages of the bank of shift registers. The last stage of each register is therefore ignored, while all the preceding stages drive the conference combiner. Hence the input to the combiner at any particular time will be a maximum of nineteen PCM words, the bits of each word being presented in parallel. The combiner is thus a parallel adder: if companding is used in the modulation it must be of a digital form, in which case the adder must be weighted to handle it. The combined output is presented on a group of parallel conference highways CH1-CHN, to the outgoing links and switched into the required link by the gate controlled by the extra bit bj written into those rows of the connection store C3 for the conferees. Hence each conferee receives the summation of all the conferee's speech, except his own, and no decision has to be made as to who is the source. If the adder delay is too large to allow parallel addition to take place, serial addition may be necessary and can be performed by reforming the PCM characters in serial form at the input to the combiner and introducing the summed word back into the switch after the main parallel to serial converters.

MULTI-HIGHWAY SWITCH

The problem of the multi-highway switch for character multiplex is the same as in the bit multiplex case, viz. the possibility of more than one conferee having the same time slot. In the voice switched system required for Δ-Σ modulation this is dealt with by having a separate conference highway for each main highway and inhibiting the message bit from reaching the source while switching an idle code onto the conference highway serving the source at the source's slot time. In the case of PCM this system is not possible because the system does not use voice switching for the conference, but an analogous system can be used by making use of a digital subtractor. Each group of highways (FIG. 9), (each highway in a group handles one bit of the PCM character) drives a group of shift registers SRA-SRN which fill with the message characters of the conferees.

The conference combiner adds the contents of every register stage, taking into account the companding law, including the contents of the last stage of each group of registers. The output from the combiner drives a number of digital subtractors S1-SN, the number to be subtracted from this input being taken from the last stage of each of the group of registers. The outputs from the subtractors then go onto conference highways CH1-CHN, there being the same number of conference highways as there are main highways. Hence at any slot time the conferee defined by that slot time and a link receives the sum of all the other conferees' PCM characters, his own character being subtracted from the total sum of all conferees' characters prior to gating the result onto the conference highway serving that group of links on one of which is the conferee considered.

SHARED-HIGHWAY PCM SWITCH

The operation of this switch in the normal duplex mode is exactly analogous to the bit multiplexed case, with the exception that now each highway becomes a group of parallel highways, each highway within the group switching one of the PCM character bits via ganged crosspoints. The conference facility can therefore be provided in the same way as for the PCM multi-highway switch described above, the organization of the crosspoints to gate the conferee's message characters into the shift registers being performed exactly as in the bit-multiplexed case. This is shown in FIG. 10, with one highway in each parallel group shown for simplicity.

I claim:

1. An automatic telephone exchange in which communication connections are set up in time division multiplex manner, comprising means for conveying speech by delta-sigma modulation whereby a steady state value repesenting the absence of speech is transmitted as a series of discrete bits alternating between 1 and 0 and a variable signal representing speech is transmitted as a series of bits where each successive bit indicates an increase or a decrease in speech level, a plurality of incoming multiplex highways to and outgoing multiplex highways from the exchange, a conference circuit provided for the establishment of conference calls involving three or more subscriber lines coupled to the exchange and served by the exchange in time division multiplex channels, said conference circuit including storage means for recording signals from each subscriber line at the time received, said conference circuit including a scanner which scans the storage means containing signals from each subscriber line coupled for a conference call in search of a particular line whose user has commenced to talk, said scanner determining which channel is in use by a user who has commenced to talk by detecting when the bits occurring in a chanel are initially a sequence of 1's indicating the channel is in the talking condition, gating means coupled responsive to the detection of said particular line to switch that line's channel to the signals in use by the other lines involved in the conference, and gating means responsive to said detection for transmitting an "idle" signal formed by an alternating series of 1's and 0's from an idle code generator to the channel of said particular line and preventing the transmission of said particular line's signals from being returned thereto, thereby preventing excessive sidetone in the talking channel.

2. An automatic telephone exchange as claimed in claim 1, in which the exchange includes a single multiplex highway which interconnects said incoming and outgoing highways, and in which the speech samples dealt with are handled in super-multiplex manner on said single highway.

3. An automatic telephone exchange as claimed in claim 1, in which the exchange includes a plurality of multiplex highways each of which can interconnect some at least of said incoming highways and some at least of said outgoing highways, and in which the speech samples dealt with are handled in super-multiplex manner on said plurality of highways.

4. An automatic telephone exchange as claimed in claim 1, in which the exchange is of the so-called space-time-space type.

* * * * *

UNITED STATES PATENT OFFICE
CERTIFICATE OF CORRECTION

Patent No. 3,748,394 Dated July 24, 1973

Inventor(s) David Michael Thomas

It is certified that error appears in the above-identified patent and that said Letters Patent are hereby corrected as shown below:

Column 10, line 17, "channel to the signals" should read -- signals to the channels --.

Signed and sealed this 27th day of August 1974.

(SEAL)
Attest:

McCOY M. GIBSON, JR.
Attesting Officer

C. MARSHALL DANN
Commissioner of Patents